(12) United States Patent
Barnetson et al.

(10) Patent No.: US 9,243,757 B2
(45) Date of Patent: Jan. 26, 2016

(54) RETROFIT LED LIGHTING SYSTEM FOR REPLACEMENT OF FLUORESCENT LAMP

(71) Applicant: Lunera Lighting, Inc., Anaheim, CA (US)

(72) Inventors: Donald Barnetson, Mountain View, CA (US); Peter Shen, Beijing (CN); Chris Miao, Beijing (CN)

(\*) Notice: Subject to any disclaimer, the term of this patent is extended or adjusted under 35 U.S.C. 154(b) by 0 days.

(21) Appl. No.: 14/100,180

(22) Filed: Dec. 9, 2013

(65) Prior Publication Data

US 2014/0328065 A1 Nov. 6, 2014

Related U.S. Application Data

(63) Continuation-in-part of application No. 13/886,262, filed on May 2, 2013, now Pat. No. 9,028,105.

(51) Int. Cl.
*H05B 37/02* (2006.01)
*F21K 99/00* (2010.01)
*H05B 33/08* (2006.01)

(52) U.S. Cl.
CPC ............... *F21K 9/13* (2013.01); *H05B 33/0821* (2013.01)

(58) Field of Classification Search
CPC .................................. H05B 37/02; F21K 9/30
USPC .......... 315/192, 210, 224, 291, 294; 362/227, 362/253, 393
See application file for complete search history.

(56) References Cited

U.S. PATENT DOCUMENTS

| | | | |
|---|---|---|---|
| 5,073,845 A | 12/1991 | Aubrey | |
| 5,365,411 A | 11/1994 | Rycroft et al. | |
| 5,577,832 A | 11/1996 | Lodhie | |
| 5,688,042 A | 11/1997 | Madadi et al. | |
| 7,926,977 B2 | 4/2011 | Nall et al. | |
| 8,057,070 B2 | 11/2011 | Negley et al. | |
| 8,573,807 B2 * | 11/2013 | Borkar | H05B 33/0845 362/184 |
| 8,579,463 B2 | 11/2013 | Clough | |
| 8,760,051 B2 * | 6/2014 | Ramer et al. | 315/51 |
| 2007/0041220 A1 | 2/2007 | Lynch et al. | |
| 2008/0019142 A1 * | 1/2008 | Rapeanu et al. | 362/555 |
| 2008/0055915 A1 | 3/2008 | Lynch et al. | |
| 2008/0084167 A1 * | 4/2008 | Waffenschmidt et al. | 315/210 |
| 2008/0290814 A1 | 11/2008 | Leong et al. | |
| 2010/0244696 A1 | 9/2010 | Kim | |
| 2011/0193491 A1 | 8/2011 | Choutov et al. | |
| 2012/0161666 A1 | 6/2012 | Antony et al. | |
| 2012/0314414 A1 * | 12/2012 | Flaherty et al. | 362/249.02 |
| 2012/0319582 A1 | 12/2012 | Shan | |
| 2013/0002157 A1 * | 1/2013 | van de Ven et al. | 315/192 |
| 2014/0203716 A1 | 7/2014 | Tao | |

\* cited by examiner

*Primary Examiner* — Tung X Le
(74) *Attorney, Agent, or Firm* — Henry J. Cittone; Cittone & Chinta LLP (57) ABSTRACT

A LED retrofit lamp for replacement of socket fitted CFL lamp driven by fluorescent ballast is provided. The retrofit lamp comprises a plurality of LEDS in connection with the fluorescent ballast. The circuit of the lamp comprises a bridge rectifier that converts the AC waveform into DC.

10 Claims, 8 Drawing Sheets

Fig. 8

RETROFIT LED LIGHTING SYSTEM FOR REPLACEMENT OF FLUORESCENT LAMP

CROSS REFERENCE TO THE RELATED APPLICATION

This application is a continuation-in-part of U.S. patent application Ser. No. 13/886,262 filed May 2, 2013, the disclosure of which is hereby incorporated by reference in its entirety.

FIELD OF THE INVENTION

The present application relates to a lighting system, and more particularly to a LED retrofit lighting system for fluorescent lamp.

BACKGROUND

The development of electrical power well over a century ago revolutionized artificial lighting. It was then that the flame was replaced as the main source of artificial light in favor of electrically powered lighting. Since that time, the history of electric lighting has been one of continuous development punctuated by a series of major innovations.

The most commonly used lamps are Incandescent lamps, The halogen incandescent lamp, Gas discharge lighting, Low-pressure sodium lamps, High-pressure sodium lamps, Fluorescent lamps, High-pressure mercury lamps, Metal halide lamps, Ceramic metal halide lamps.

Among different luminaries, Fluorescent lamps have been widely used in various residential, commercial and industrial sectors. Fluorescent lamps are used broadly in the commercial, hospitality and retail market as down light. These fluorescent lamps are driven by a ballast, which generates a high voltage applying across the two ends of the lamp to ignite it and stabilizes the current flowing through the lamp. The fluorescent lamp has poor electrical efficiency, provides a relatively poor quality of light and lasts only 10,000 hours after which is must be disposed of through proper channels due to the mercury content.

The most recent evolution in lighting is solid state lighting based on light emitting diode (LED) technology. The light generation principle is similar to what happens in gas discharge lamps, but now the discharge happens in a solid state material: orbit changing electrons cause atoms to get 'excited' that subsequently fall back to their natural state thereby releasing its surplus energy in the form of radiation. The advancement in microelectronics technology have led light-emitting-diode (LED) technology to generate lighting and special purpose lighting applications.

Due to the reason that fluorescent lamp are not as energy-efficient as LED lamps today and pollution caused due to leakage of mercury from wasted fluorescent lamp, the idea of replacing the fluorescent lamp with LED is getting more and more popular. However the main concern for replacing fluorescent lamp with LED lamp is the considerable labor costs involved in the installation, because people need to open the light fixture to disassemble the existing ballast, either it be an electronic one, or a magnetic one. Another concern involved in the replacement of fluorescent lighting with LED is the lack of recycle scheme of ballast. Therefore in view of above constraints, it would be advantageous to have LED retrofit lamp that can directly replace the existing fluorescent lamp.

BRIEF SUMMARY OF THE INVENTION

The present invention provides a retrofit lamp that provides a replacement for a socket fitted CFL lamp. The retrofit LED lamp consists of a circuit that converts the AC waveform generated by the fluorescent ballast into the DC waveform suitable for the LEDs.

The retrofit lamp comprises a MCPCB plate mounted with strings of LEDs, a heat sink to dissipate the heat generated by LEDs, a diffuser, a PCB circuit that converts the output from fluorescent ballast into the DC suitable for working of LEDs, a pin carrying plug fittable into socket. The PCB circuit comprises of a bridge rectifier having schottky diodes, and a large capacitor placed in parallel to the bridge rectifier. The retrofit lamp is compatible with existing fluorescent ballast and hence does not require the removal of fluorescent ballast while replacing the CFL lamp with the LED lamp.

BRIEF DESCRIPTION OF THE DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF THE EMBODIMENTS

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The present invention provides a retrofit lamp that provides a replacement for a socket fitted CFL driven by a ballast. The circuit of the retrofit lamp comprises of a bridge rectifier that is used to convert the AC waveform of the Fluorescent ballast to a single sided and a capacitor to filter the waveform to generate DC output to LED. The ballast can be an electronic ballast or an electromagnetic ballast.

Figure 1:
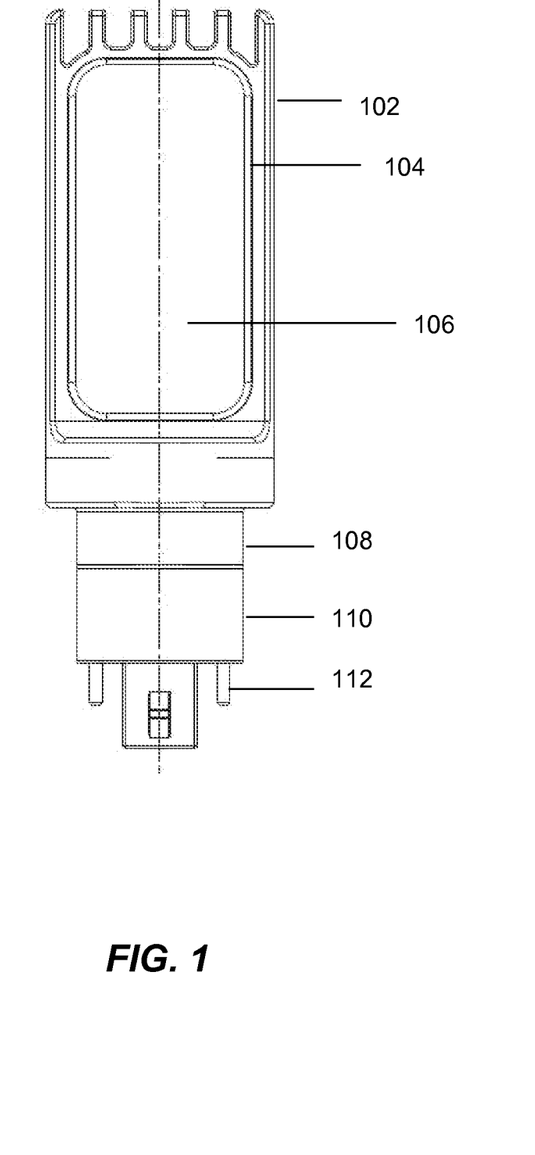
FIG. 1 illustrates the front view of horizontal version of a retrofit lamp that can be used as a replacement for a socket fitted fluorescent lamp driven by a fluorescent ballast, in accordance with an embodiment of the present invention.

FIG. 1 illustrates the front view of horizontal version of a retrofit lamp that can be used as a replacement for a socket fitted fluorescent lamp driven by a fluorescent ballast, in accordance with an embodiment of the present invention. Referring FIG. 1, the retrofit lamp comprises of a plurality of LEDs mounted on a MCPCB plate 104 and is placed in a housing 102 that keeps the plurality of LEDs in a fixed position. The housing can be circular, cylindrical, rectangular or a square housing typically used with fluorescent lamp. The housing 102 provides a means for heat sink for LEDs by providing a path for heat from the LED source to the outside medium. The thermal conductivity of the material of the housing 102 directly affects dissipation of heat through conduction. The housing 102 can be made of aluminum or copper or thermoplastic material or a natural graphite solution that offer better thermal transfer than copper with a lower weight than aluminum. The heat sink made of natural graphite solution has the ability to be formed into complex two dimensional shapes. The housing 102 is covered with a diffuser 106 to emit the light generated by the plurality of LEDs to outside. The housing 102 is fitted with a connector 108 on its distal end, the connector 108 is then connected to a plastic plug 110 similar to the one used in conventional fluorescent lamp for fitting the fluorescent lamp into the electric socket. The plastic plug 110 is having multiple pins 112 as an extension which when fitted in the socket provides electrical connection to the retrofit LED lamp. The socket can be a G24q, GX24q, G24d, GX24d, G-23, GX23, GX32d-2, GX32d-3 type socket.

The retrofit lamp is a LED lamp that provides a replacement to the existing fluorescent lamp driven by the electronic ballast. The retrofit lamps work on the electric current supplied by the electronic ballast, and hence it can directly replace the existing fluorescent lamp without removing the existing ballast.

Figure 2:
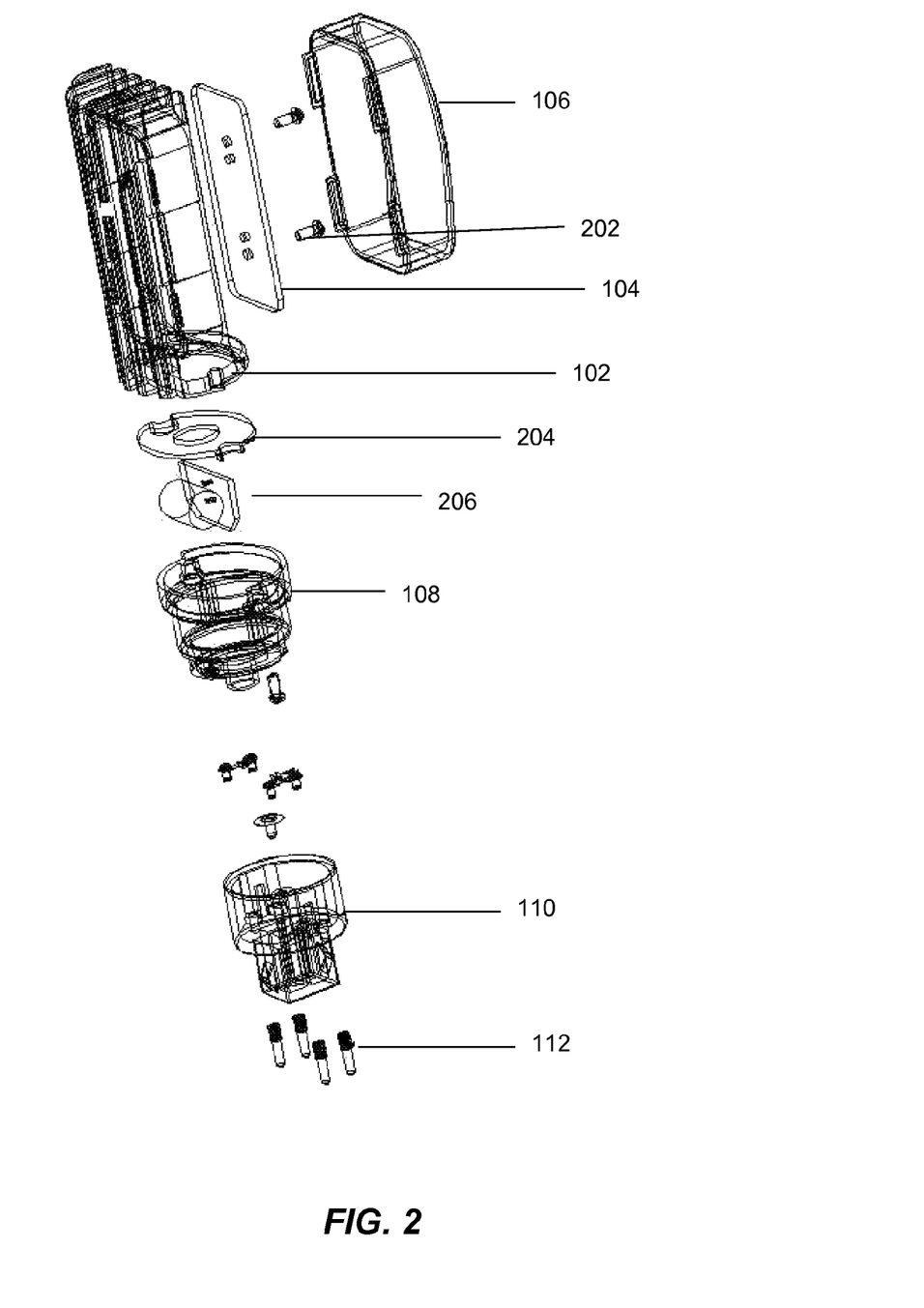
FIG. 2 illustrates an exploded view of the horizontal version of a retrofit lamp that serves as a replacement for the existing fluorescent lamp in accordance with an embodiment of the present invention.

FIG. 2 illustrates an exploded view of the horizontal version of a retrofit lamp that serves as a replacement for the existing socket type fluorescent lamp in accordance with an embodiment of the present invention. Referring to FIG. 2, the replacement lamp comprises a plurality of LEDs arranged on a MCPCB Metal Core PCB) plate 104. The MCPCB 104 incorporates a base metal material as heat spreader as an integral part of the circuit board. The base metal material can be aluminum alloy or alternatively it incorporates a dielectric polymer layer with high thermal conductivity for lower thermal resistance. The plurality of LEDs is arranged in a linear manner on the MCPCB plate 104 such that the output angle of the emitted light is perpendicular to the surface of MCPCB plate 104. The MCPCB plate 104 is mounted on a housing 102 through a screw 202. The housing 102 is meant for dissipation of excess heat generated by the lightening of LEDs. The housing 102 act as a heat sink for the retrofit lamp assembly. The housing 102 is preferably fabricated from aluminum, though it can be fabricated from a material having high thermal conductivity that includes, but are not limited to copper, natural graphite or a thermoplastic material. The housing 102 is designed to have a large surface area for maximum heat dissipation. Alternatively the housing is provided with a number of fine fins. A diffuser 106 is mounted on the housing 102 through a screw 202 for diffusing the light emitted by LED. The diffuser 202 is made of a glass material fabricated in a shape such that the light emitted by the LED is released by the diffuser effectively.

In an embodiment of the present invention, the retrofit lamp may have a curved diffuser. Based on the surface area of the shining surface of the panel, the size and thickness of the optimum light diffuser may be determined. A suitable diffuser may be made from a composite material of polymer and glass fiber, or from a polycarbonate/acrylic material. These materials may be designed with varying amounts of hardness and light refractory characteristics. A sufficient hardness and thickness is required for the structural integrity of the overall panel and refractory characteristics, which are also related to the thickness, are selected in order to cause the light to be transmitted evenly across the diffuser. Another advantage of using a sufficiently thick diffuser is that it prevent the LED sources from getting visible thus increasing the aesthetic values and from causing multiple shadows on the object.

A ring cover 204 is provided at the end of housing 102 such that the ring cover 204 seals the bottom circular end of the housing 102. A PCB 206 is mounted at the bottom of ring cover 204, the said PCB 206 comprises of a circuit for converting the AC waveform receives from the ballast to a DC volt suitable for driving the LEDs. The PCB circuit is housed in a connector 108, the connector 108 perform the function of connecting the output from electric socket to the PCB 206. The connector 108 is fabricated from a non conductive polymer or a thermosetting polymer. The connector 108 is fitted in a plastic plug 110 that has a shape of cap of existing fluorescent lamp. The plastic plug 110 contains a plurality of pins protruding from the base of plastic plug 110 that is used to establish electric connection with the electric socket. The circuit in PCB 206 of the retrofit lamp is compatible to work with the output waveform given by the ballast. The plastic plug 110 of the LED lamp may be designed to fit into G24q, GX24q, G24d, GX24d, G-23, GX23, GX32d-2, GX32d-3 type socket.

In an embodiment of the present invention the plastic plug 110 of LED lamp can be rotated on its axis thus enabling the LED lamp to be fitted into socket placed at different angle.

Figure 3A:
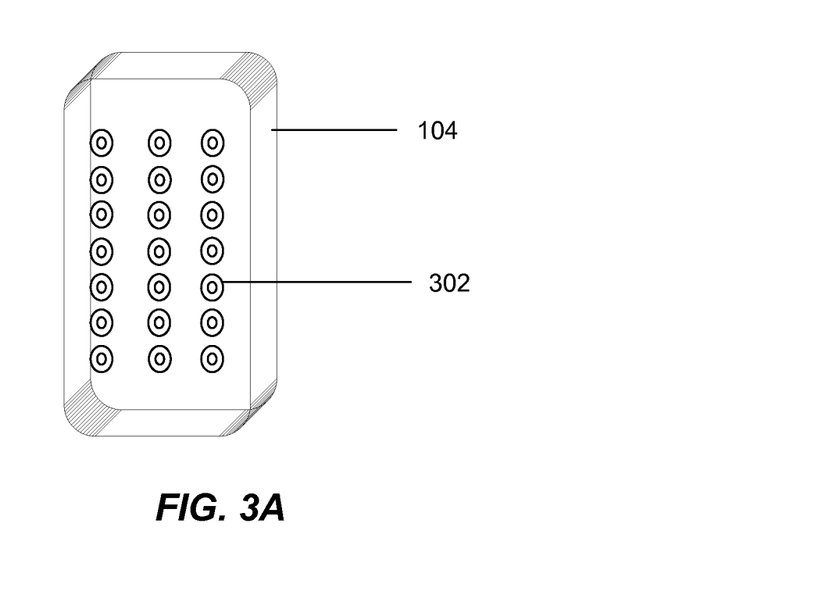
FIGS. 3A and 3B illustrate a schematic representation of an array of LEDs arranged on the MCPCB plate in accordance with an embodiment of the present invention.
Figure 3B:
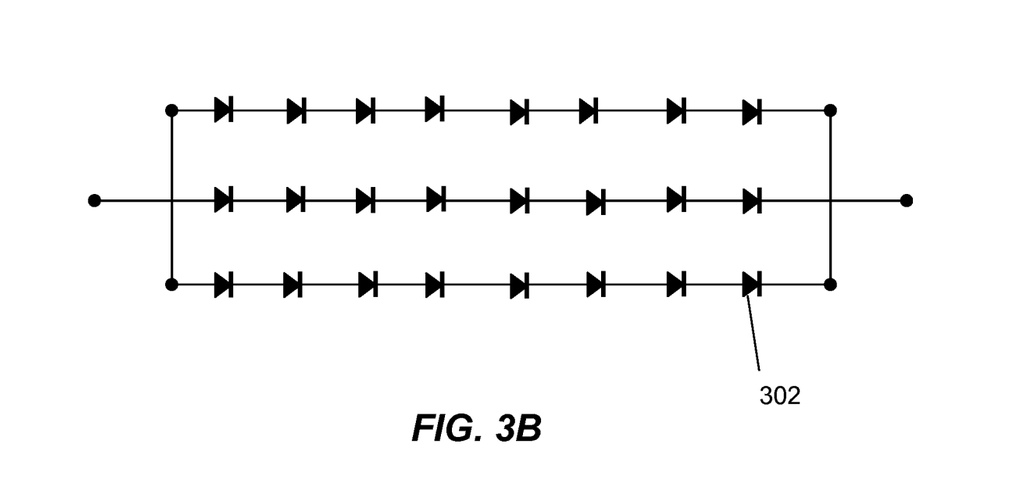

FIG. 3 illustrates a schematic representation of array of LEDs arranged on the MCPCB plate in accordance with an embodiment of the present invention. Referring FIG. 3 (a), the MCPCB plate 104 is mounted with a plurality of LEDs 302 arranged in a linear fashion. The plurality of LEDs 302 is arranged on the MCPCB plate in such a manner that the output angle of the light is in perpendicular orientation to the MCPCB plate. Since the diffuser 106 is fitted over the MCPCB plate 104 with horizontal axis parallel to the MCPCB plate 104, hence the light emitted by the plurality of LEDs 302 will pass through the exit aperture directly. This makes the retrofit lamp a directional emitter and over 80 percent of the light is emitted directly from the fixture and only a small amount of the light is emitted towards the surface. The light emitted towards surface will then be reflected from the surface coated with reflector. The characteristic feature of the retrofit lamp, the lamp emitting light directly from the exit aperture makes the optical efficiency of the retrofit lamp greater than 80 percent. The conventional lamp are only 50 percent optical efficient as the conventional CFL lamp is omni-directional emitter and only a small portion of light is emitted directly from the exit aperture and a large portion of light is emitted after reflection from the lamp surface. FIG. 3(b) shows a plurality of LEDS 302 connected in a series to the output of PCB circuit.

Figure 4:
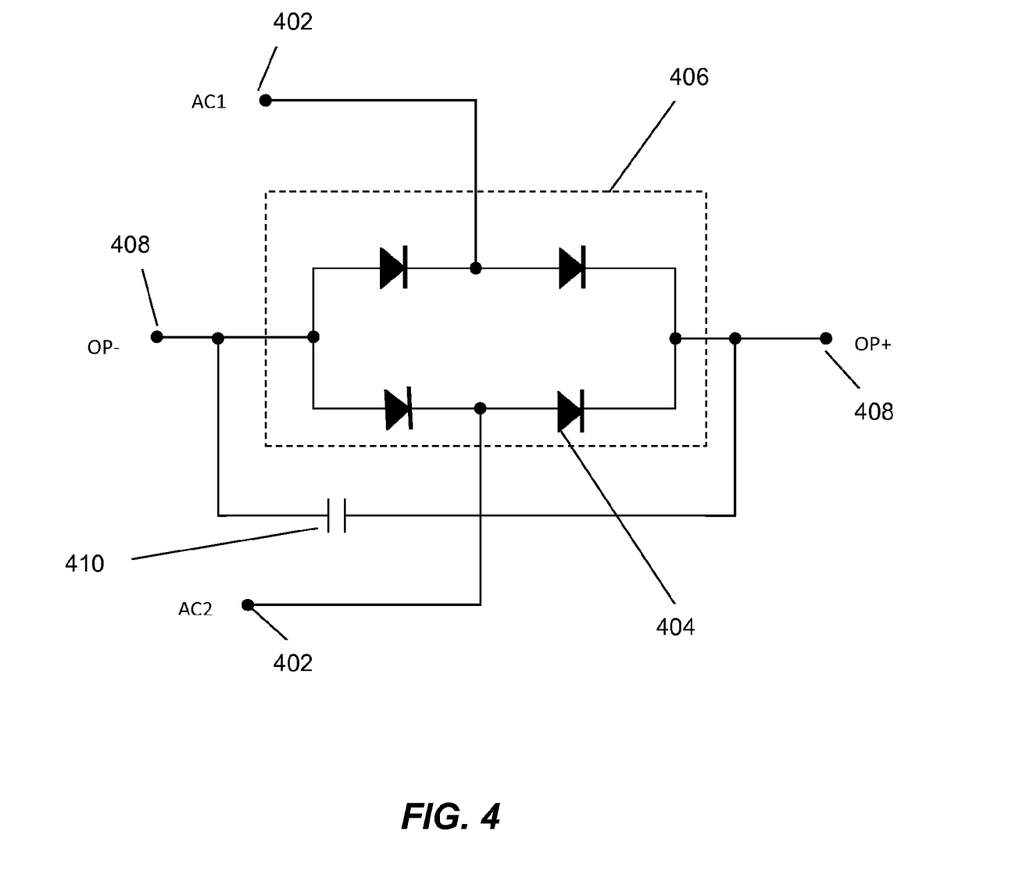
FIG. 4 illustrates the circuit diagram of the PCB, in accordance with an embodiment of the present invention.
Figure 5:
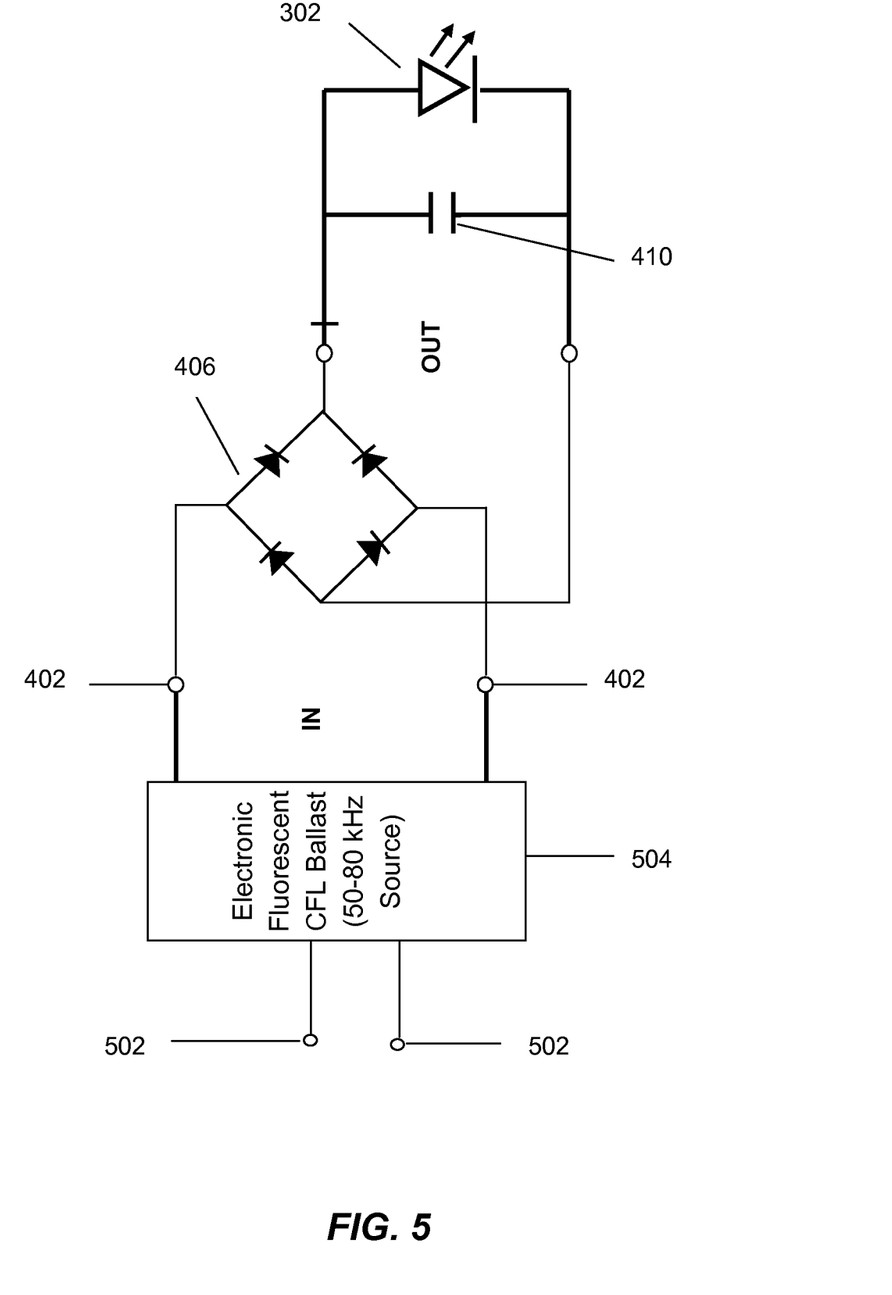
FIG. 5 illustrates a circuit diagram for the retrofit lamp driven by a fluorescent ballast, in accordance with an embodiment of the present invention.

FIG. 4 illustrates the circuit diagram of the PCB 206, in accordance with an embodiment of the present invention. Referring FIG. 4, the output 402 from the electronic or electromagnetic ballast serves as an input to the PCB circuit 206. The input is then feed into a bridge rectifier 406, that converts the AC waveform of the Fluorescent ballast to a single sided waveform. The bridge rectifier 406 is made of four diodes 404 arranged in a bridge manner. The diodes 404 used in the bridge rectifier are schottky diodes 404 and not the traditional silicon diode. A capacitor 410 is placed in parallel to the bridge rectifier 406. The capacitor 406 filters the single sided waveform to reduce the ripple current and the output from the circuit is then serve as an input to the plurality of LEDs 302. FIG. 5 illustrates a circuit diagram for the retrofit lamp driven by a fluorescent ballast, in accordance with an embodiment of the present invention. The AC main supply 502 is supplied as an input to the fluorescent ballast 504. The ballast 504 works on the 50-80 kHz source. The output from the fluorescent ballast is then feed as an input to a bridge rectifier 406 that convert the AC waveform 402 generated by the electronic/fluorescent ballast 504 to a single sided waveform. The capacitor 410 is placed in parallel to the output from the bridge rectifier 406. The output from the rectifier 406 has ripple current associated with it. The capacitor 410 filters the single sided waveform and eliminates the ripple current to generate steady DC volt to serve as supply to the LEDs 302. In a preferred embodiment, the diodes 404 used in bridge rectifier are schottky diodes. The high speed schottky diodes 404 are used in bridge rectifier 406 rather than traditional silicon diode to better compensate for the high speed AC waveform 50 kHz produced by the electronic ballast 504. A normal silicon diode has a voltage drop between 0.6-1.7 volts, while a Schottky diode voltage drop is between approximately 0.15-0.45 volts. This lower voltage drop provide higher switching speed and better system efficiency resulting in better compensation for high speed AC waveform (50 Hz) produced by the ballast.

Figure 6:
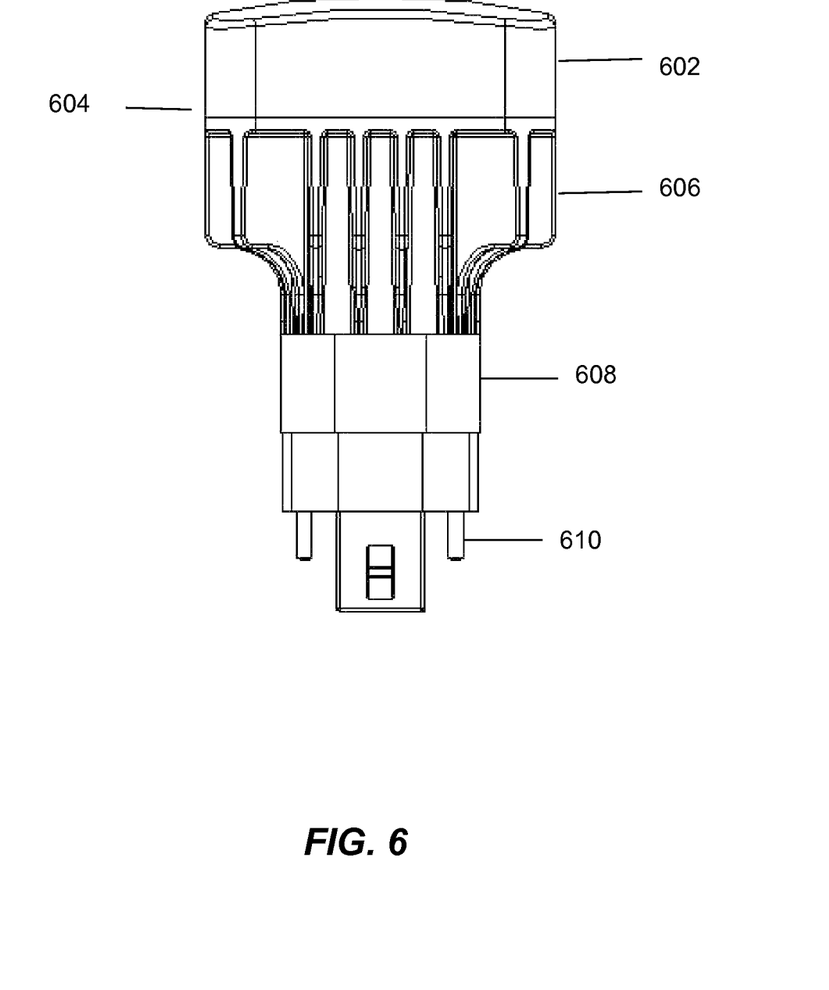
FIG. 6 illustrates the front view of a vertical version of a retrofit lamp that serves as a replacement for the existing fluorescent lamp driven by fluorescent ballast in accordance with an embodiment of the present invention.

FIG. 6 illustrates the front view of a vertical version of a retrofit lamp that serves as a replacement for the existing fluorescent lamp driven by fluorescent or electronic ballast, in accordance with an embodiment of the present invention. The retrofit lamp comprises of a MCPCB plate 604 having a plurality of LEDs 302 mounted on it, a diffuser 602 to diffuse the light emitted by LED 302, a heat sink 606 for dissipating the heat generated by the LEDs, a plastic plug 608 having a plurality of pins 610 protruding out of the plug 608 that serves as a connection to the output from electric socket to the circuit embedded in the retrofit lamp.

Figure 7:
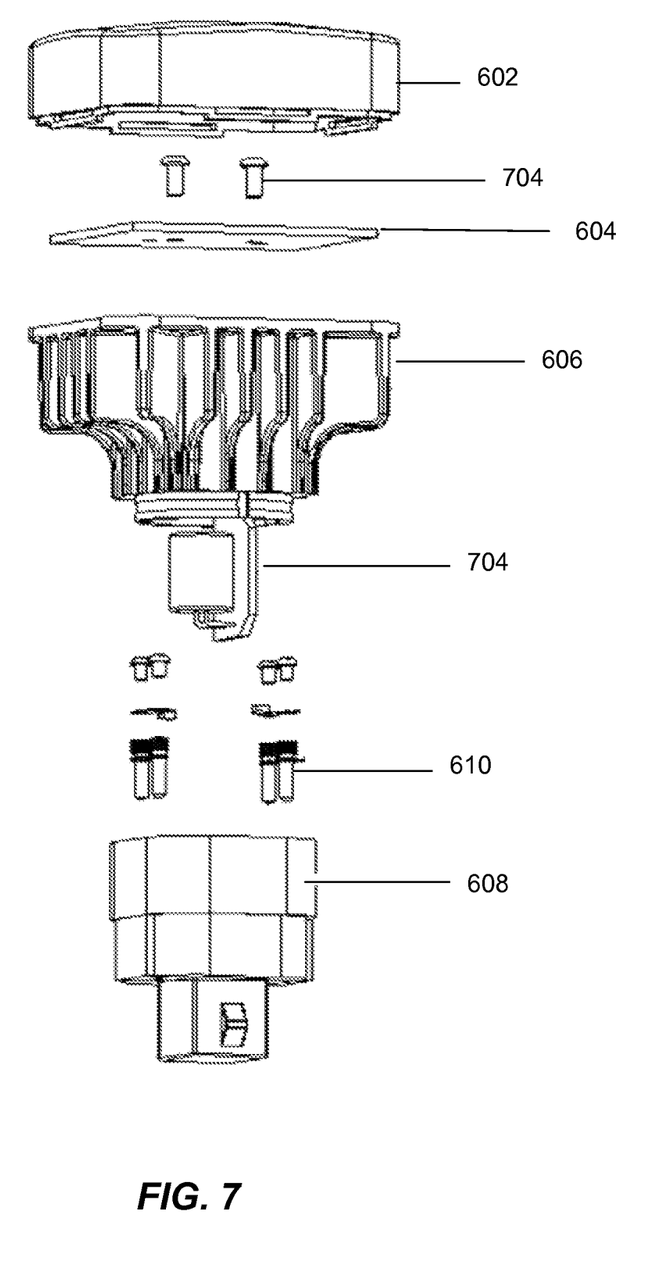
FIG. 7 illustrates the exploded view of a vertical version of a retrofit LED lamp that serves as a replacement for conventional fluorescent lamp driven by a fluorescent ballast in accordance with an embodiment of the present invention.

FIG. 7 illustrates the exploded view of a vertical version of a retrofit LED lamp that serves as a replacement for conventional fluorescent lamp driven by an electronic or fluorescent ballast in accordance with an embodiment of the present invention. Referring to FIG. 7, the replacement lamp comprises a plurality of LEDs 302 arranged on a MCPCB Metal Core PCB) plate 604. The MCPCB 604 incorporates a base metal material as heat spreader as an integral part of the circuit board. In an embodiment of the present invention the MCPCB plate 604 is fabricated out of the material consisting of aluminum alloy, or dielectric polymer. The plurality of LEDs 302 is arranged in a linear manner on the MCPCB plate 604 such that the light emitted by the plurality of LEDs 302 is emitted perpendicular to the surface of MCPCB plate 604. In another embodiment of the present invention the length of LED string is increased for power scaling and to increase the forward voltage. The MCPCB plate 604 is mounted on a housing 606 meant for dissipation of heat, using a screw 702. The housing 606 is preferably fabricated from aluminum or copper or natural graphite or a thermoplastic material. A diffuser 602 is mounted on the housing 606 through a screw 702. A ring cover is provided at the end of housing such that the ring cover seals the bottom circular end of the housing. A PCB 704 is mounted at the bottom of the ring cover, the said PCB 704 comprises of a circuit for converting the AC waveform receives from the electronic ballast to a DC volt suitable for driving the LEDs 302. The PCB circuit is housed in a plastic plug 608 that has a shape of cap of existing fluorescent lamp. The plastic plug 608 contains the plurality of pins 610 protruding from the base of plastic plug 608 that is used to establish electric connection with the electric socket. The circuit in PCB 704 of the retrofit lamp is compatible to work with the output waveform given by an electronic or electromagnetic ballast.

Figure 8:
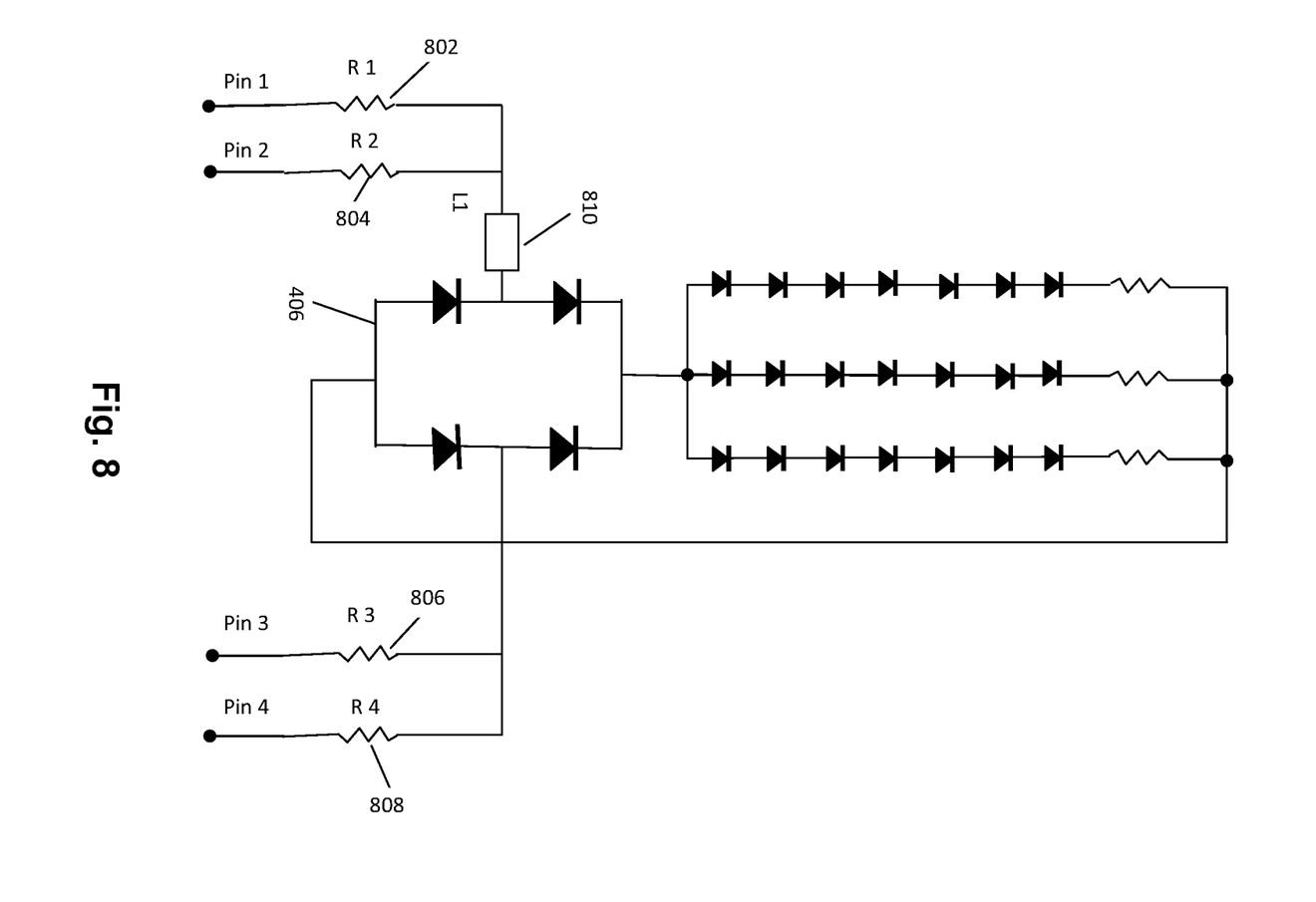
FIG. 8 is an extended circuit diagram of the LED retrofit lamp, in accordance with an embodiment of the present invention.

FIG. 8 is an extended circuit diagram of the LED retrofit lamp, in accordance with an embodiment of the present invention. Referring to FIG. 8, the output 402 from the electronic or electromagnetic ballast serves as an input to the LED retrofit lamp. The power is fed through a plurality of pins: pin 1, pin 2, pin 3 and pin 4. Each of the plurality of pin is having a corresponding resistor placed in series with the pin that serves as a thermal fuse for the input of the power supply. The resistors R1 802, R2 804, R3 806 and R4 808 are in series with the Pin 1, Pin 2, Pin 3 and Pin 4 respectively. Pin 1 and Pin 2 in the figure denote the cathode input for the retrofit lamp and Pin 3 and Pin 4 correspond to the anode input. The resistors R1 802, R2 804, R3 806 and R4 808 act as thermal fuse for the power input of the retrofit LED lamp. The thermal fuses are provided in the LED retrofit lamp to prevent the high current from flowing in to the circuit in the event of open circuit arc voltage. The high current passing through the input can cause substantial damage to the circuit of LED retrofit lamp.

An inductor L1 810 is placed in series with the cathode input of the retrofit LED lamp. Conventional fluorescent lamps have a linear voltage/current relationship thus creating sinusoidal waveform between the lamp and the ballast. Sometimes, in case of LED lamp, when the forward voltage is exceeded, the circuit creates a square waves between the ballast and the retrofit lamp. These square waves resulted in noise on the internal bus, interfering with the power factor correction circuit, resulting in creation of flicker in the retrofit LED lamp. The inductor L1 810 filters the waveform coming from the cathode input and prevents the formation of square waves between the ballast and the retrofit lamp, thus increasing the efficiency of the lamp.

In an aspect of the invention the inductor L1 810 is having inductance selected from the range of 50 uH-200 uH.

In an alternative embodiment, a capacitor is used to filter the single side waveform produced by the bridge rectifier so as to reduce the ripple current associated with the waveform. The capacitor is placed in parallel to the string of LEDs and the output of the bridge rectifier.

The bridge rectifier 406 consists of four schottky diodes arranged in a bridge form received the input from the inductor L1 810 and the anodic Pin 3 and Pin 4. The bridge rectifier 406 convert the AC waveform 402 generated by the electronic/fluorescent ballast 504 to a single sided waveform.

In a preferred embodiment, the diodes 404 used in bridge rectifier are schottky diodes. The high speed schottky diodes 404 are used in bridge rectifier 406 rather than traditional silicon diode to better compensate for the high speed AC waveform 50 kHz produced by the electronic ballast 504. A normal silicon diode has a voltage drop between 0.6-1.7 volts, while a Schottky diode voltage drop is between approximately 0.15-0.45 volts. This lower voltage drop provide higher switching speed and better system efficiency resulting in better compensation for high speed AC waveform (50 Hz) produced by the ballast.

A series of string of LEDs are arranged in a linear fashion. The DC waveform generated by the bridge rectifier 406 is fed to the string of LEDs. Each series of LEDs is having a resistor connected in series with the LEDs. In an aspect of the present invention, the resistors connected in series with the string of LEDs are having resistance of 4-8 ohms.

In another embodiment of the present invention, the circuit of the retrofit LED lamp is mounted on the Metal core PCB plate, resulting in proper thermal dissipation.

We claim:

1. A retrofit LED lamp driven by a ballast, the lamp comprising:
    a string of LEDs with a series resistance mounted on a metal core printed circuit board (MCPCB) plate;
    a circuit comprising an anode end and a cathode end that serves as an input from the ballast;
    a thermal cut off means comprising a series resistor connected with each of the input coming from the cathode end and the anode end;
    a full wave bridge rectifier equipped with a first input terminal coupled to the anode end and a second input terminal coupled to the cathode end, said full wave bridge rectifier having a output connected to the string of LEDs;
    wherein the said circuit is mounted on the MCPCB plate and wherein the ballast is external to the retrofit LED lamp.

2. The retrofit LED lamp of claim 1 wherein the ballast is a fluorescent ballast, or an electronic ballast, or an electromagnetic ballast.

3. The retrofit LED lamp of claim 1 wherein the MCPCB plate is fabricated from material comprising aluminum alloy or dielectric polymer.

4. The retrofit LED lamp of claim 1 wherein the full-wave bridge rectified is made of schottky diodes.

5. The retrofit LED lamp of claim 4 wherein the schottky diode compensates for the high speed waveform produced by ballast.

6. The retrofit LED lamp of claim 1 wherein an inductor is placed between the first input terminal of the full wave bridge rectifier and the cathode end.

7. The retrofit LED lamp of claim 6 wherein the inductor is coupled at the cathode end of the input.

8. The retrofit LED lamp of claim 6 wherein the inductor has the inductance selected from the range of 50 uH to 200 uH.

9. The retrofit LED lamp of claim 6 wherein the inductor prevents the formation of square waves between the ballast and the led retrofit lamp.

10. The retrofit LED lamp of claim 1 wherein a capacitor is placed in parallel with the string of LEDs and the output of the full wave bridge rectifier.

* * * * *